(12) United States Patent
Kurts et al.

(10) Patent No.: US 10,725,848 B2
(45) Date of Patent: Jul. 28, 2020

(54) SUPPORTING HANG DETECTION AND DATA RECOVERY IN MICROPROCESSOR SYSTEMS

(71) Applicant: Intel Corporation, Santa Clara, CA (US)

(72) Inventors: Tsvika Kurts, Haifa (IL); Ki W. Yoon, Sacramento, CA (US); Michael J. St. Clair, Portland, OR (US); Larisa Novakovsky, Haifa (IL); Hisham Shafi, Akko (IL); William H. Penner, Olympia, WA (US); Yoni Aizik, Haifa (IL); Kevin Safford, Fort Collins, CO (US); Hermann Gartler, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 15/890,893

(22) Filed: Feb. 7, 2018

(65) Prior Publication Data
US 2019/0243701 A1 Aug. 8, 2019

(51) Int. Cl.
*G06F 11/00* (2006.01)
*G06F 11/07* (2006.01)
*G06F 9/38* (2018.01)

(52) U.S. Cl.
CPC ........ *G06F 11/0778* (2013.01); *G06F 9/3861* (2013.01); *G06F 11/0721* (2013.01); *G06F 11/0751* (2013.01); *G06F 11/0757* (2013.01); *G06F 11/0787* (2013.01)

(58) Field of Classification Search
CPC ............. G06F 11/0778; G06F 11/0721; G06F 11/0751; G06F 11/0766; G06F 11/0757; G06F 9/3861; G06F 11/0787
See application file for complete search history.

(56) References Cited

U.S. PATENT DOCUMENTS

| 2008/0126879 | A1* | 5/2008 | Tiwari | G06F 11/0712 |
| | | | | 714/46 |
| 2011/0113202 | A1* | 5/2011 | Branover | G06F 1/3203 |
| | | | | 711/135 |
| 2011/0179314 | A1* | 7/2011 | Patel | G06F 11/0721 |
| | | | | 714/48 |
| 2015/0006962 | A1* | 1/2015 | Swanson | G06F 11/0724 |
| | | | | 714/38.11 |
| 2015/0331754 | A1* | 11/2015 | Grobelny | G06F 9/441 |
| | | | | 714/23 |
| 2017/0147422 | A1* | 5/2017 | Koktan | G06F 11/0757 |

* cited by examiner

*Primary Examiner* — Joseph D Manoskey
(74) *Attorney, Agent, or Firm* — Lowenstein Sandler LLP

(57) ABSTRACT

Embodiment of this disclosure provides a mechanism to support hang detection and data recovery in microprocessor systems. In one embodiment, a processing device comprising a processing core and a crashlog unit operatively coupled to the core is provided. An indication of an unresponsive state in an execution of a pending instruction by the core is received. Responsive to receiving the indication, a crash log comprising data from registers of at least one of: a core region, a non-core region and a controller hub associated with the processing device is produced. Thereupon, the crash log is stored in a shared memory of a power management controller (PMC) associated with the controller hub.

20 Claims, 15 Drawing Sheets

Request for Crash Record Data

| Byte # | 7 | 6 | 5 | 4 | 3 | 2 | 1 | 0 |
|---|---|---|---|---|---|---|---|---|
| 0 | \multicolumn{8}{c}{eSPI Cycle Type: OOB Message = 21h} ||||||||
| 1 | Tag[3:0] ||||| Length[11:8] = 0h |||
| 2 | Length[7:0] = 04h ||||||||
| 3 | Dest Slave Addr [7:1] = 10h (Intel PCH PMIC SMBus MCTP) ||||||| 0 |
| 4 | Command Code = 20h-24h (Trigger_CrashLog_and_Extract) ||||||||
| 5 | Byte Count = 01h ||||||||
| 6 | Source Slave Address [7:0] = 0Fh (eSPI slave 0/EC) ||||||| 1 |

FIG. 2

Response with Crash Record Data

| Byte # | 7 | 6 | 5 | 4 | 3 | 2 | 1 | 0 |
|---|---|---|---|---|---|---|---|---|
| 0 | | | | eSPI Cycle Type: OOB Message = 21h | | | | |
| 1 | | Tag[3:0] | | | | Length[11:8] = 0h | | |
| 2 | | | | Length[7:0] = 44h | | | | |
| 3 | | | | Dest Slave Addr [7:0] – 0Eh (eSPI slave 0/E0) | | | | 0 |
| 4 | | | | Command Code = 20h-24h | | | | |
| 5 | | | | Byte Count = 41h | | | | |
| 6 | | | | Source Slave Address [7:1] = 10h (Intel PCH PMC SMBus MCTP) | | | | 1 |
| 7 | | | | Crash Record Data | | | | |
| : | | | | | | | | |
| 67 | | | | Crash Record Data | | | | |

*FIG. 3*

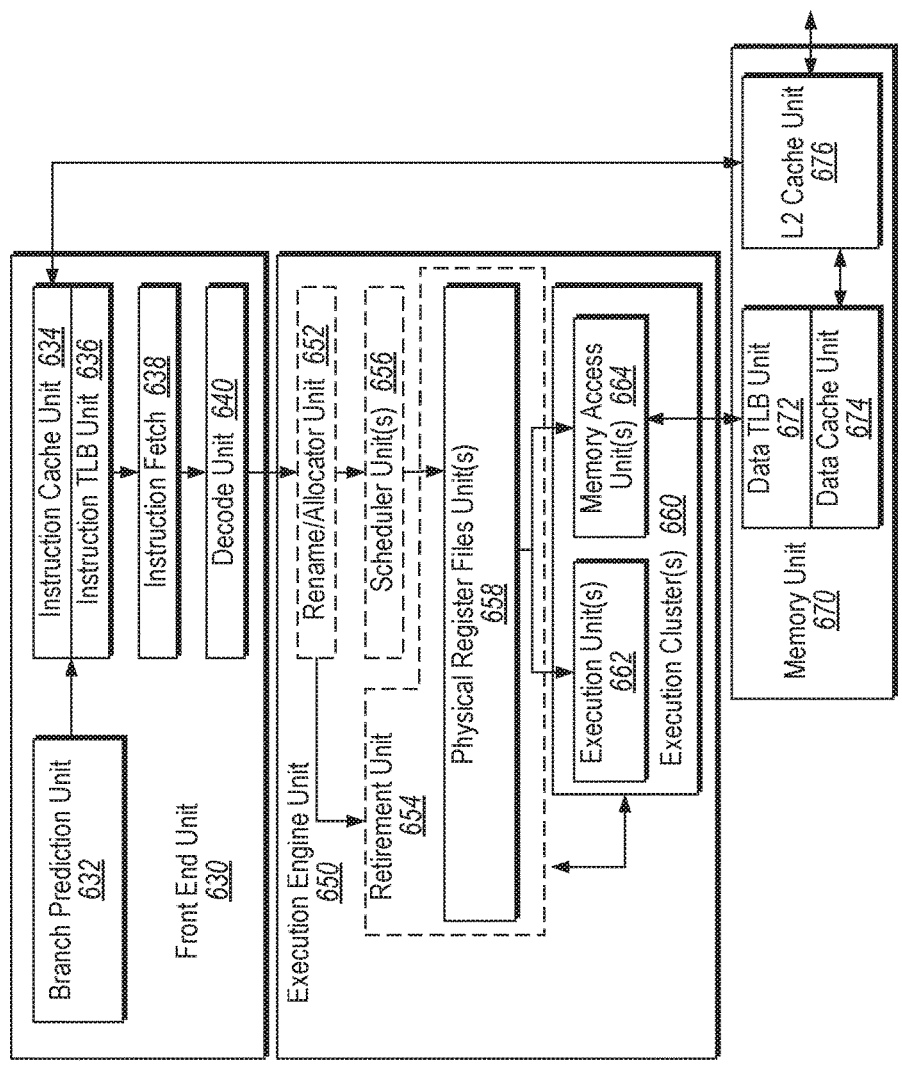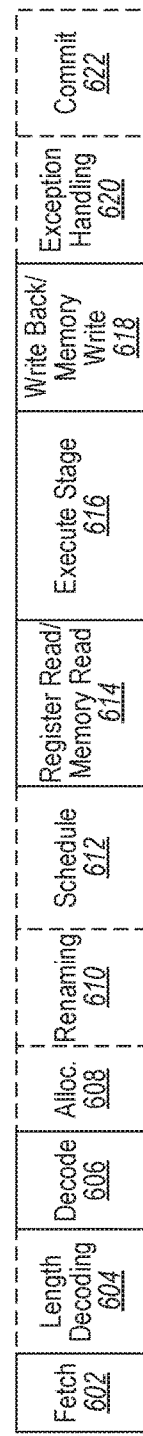
FIG. 6A
FIG. 6B

SUPPORTING HANG DETECTION AND DATA RECOVERY IN MICROPROCESSOR SYSTEMS

TECHNICAL FIELD

Embodiments of the disclosure relate generally to hardware processors, and more specifically, but without limitation, to supporting hang detection and data recovery in microprocessor systems.

BACKGROUND

A processor, or set of processors, executes instructions from an instruction set, e.g., the instruction set architecture (ISA). The instruction set is the part of the computer architecture related to programming, and generally includes the native data types, a register architecture, addressing modes, memory architecture, interrupt/exception handling, and instructions for controlling input and output (I/O) of the processor.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is block diagram illustrating a request command data structure according to various embodiments.

FIG. 3 is block diagram illustrating a response command data structure according to various embodiments.

FIG. 6A is a block diagram illustrating a micro-architecture for a processor according to an embodiment of the disclosure.

FIG. 6B is a block diagram illustrating an in-order pipeline and a register renaming stage, out-of-order issue/execution pipeline according to an embodiment of the disclosure.

DETAILED DESCRIPTION

Figure 1A:
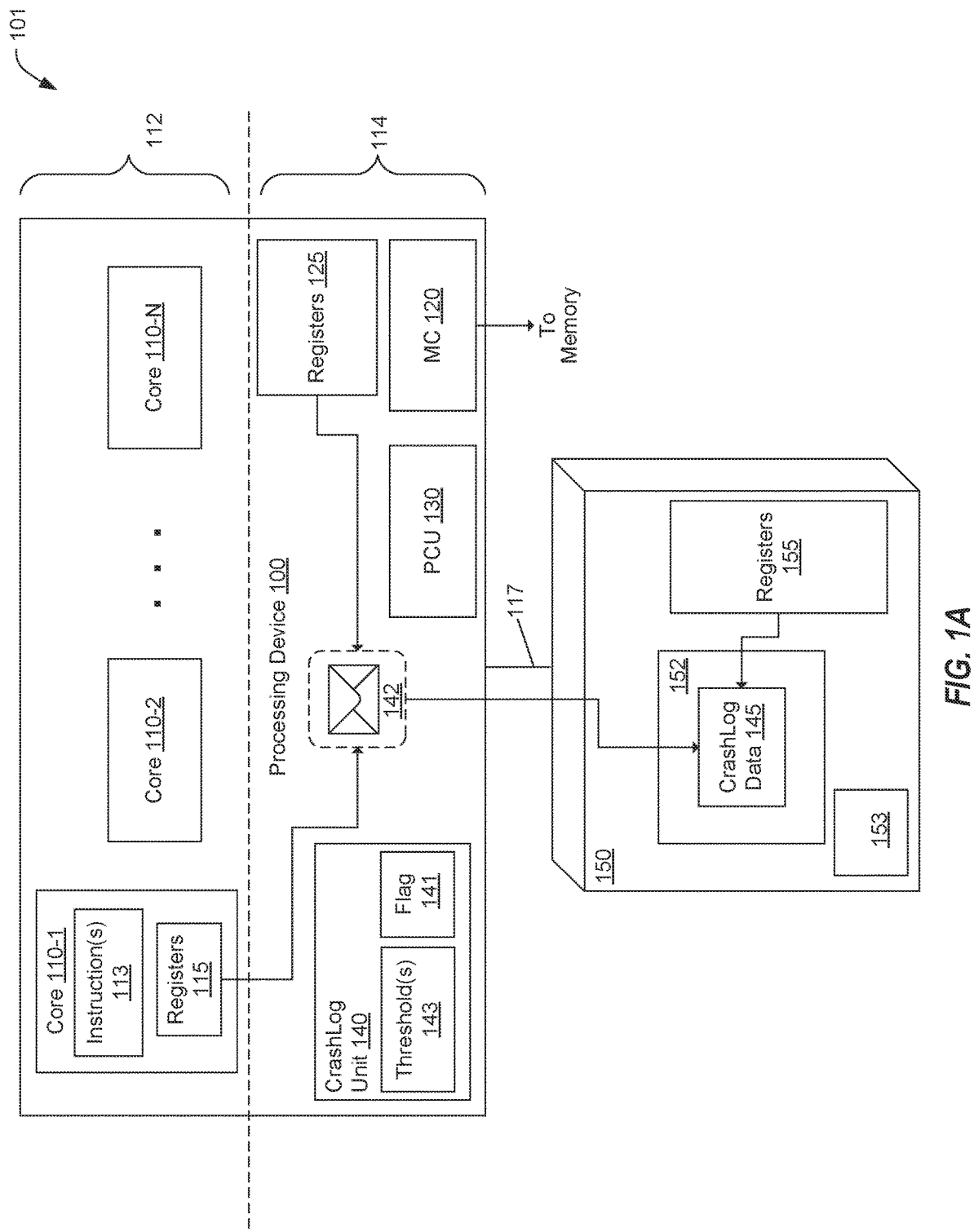
FIGS. 1A-1C illustrates a block diagram of a system to support hang detection and data recovery in microprocessor systems according to according to various embodiments.

Increasing demands for processing greater volumes of data at faster speeds continues to drive developments in the area of computer processors. In some situations, sporadic system failures can occur during certain high volume testing by a system Original Equipment Manufacturer (OEM) before a product launch. Issues in various hardware components (e.g., processors, bus controllers, drivers), software components (e.g., operating systems, applications), or any combination thereof can sometimes cause these types of system failures. Because of the complexity of the hardware and software used, many systems experience various types of errors, including complete hangs.

A hang is an unexpected unresponsive state of a system or process, such as when a processor or central processing unit (CPU) becomes unresponsive due to a processor stalling, locking up or crashing in response to some type of error. Currently, such hangs can cause data loss, as well as halting operations on the entire computer system. Due to the constant introduction of new hardware and software to the system and the large number of possible combinations there between, it may be difficult to identify and eliminate the possible cause of such errors.

Some methods used to detect the cause of the hangs have relied on out-of-band (OOB) data signals that transfer data through a stream independent from a main in-band data stream of the system, such as using a certain interface and network to read all the state information. These methods would analyze the hang source based on a snapshot of content collected via the OOB stream. This type of analysis using the OOB stream can become very complicated in which many resources are often wasted when each system manufacturer desires a new OOB data flow that is specifically created for their particular system configuration. In some situations, using an OOB path is better than using an in-band path to collect data since the in-band path has a high likelihood of getting stuck during a hang.

Another method used to detect the cause of a hang is to use a type of hardware probe (e.g., Direct Connect Interface (DCI)) that allows for the debugging of hardware components by using an external physical I/O port. Some systems, however, may include thousands of machines making it physically challenging to connect a DCI to each one. In such cases, the data at many hang points may be lost and the system or component manufacturer may not become aware of certain problems with a particular system configuration until it permeates a large number of their systems. Thus, causing the OEMs further wasted efforts and frustrations to identify the faulty component.

Embodiments of the disclosure address the above-mentioned and other deficiencies by providing techniques to detect certain hang events and gather crashlogs relevant to the event. In this regard, the crash logs are gathered in a manner in which they can survive even a global reset by the system. The crash logs comprise data retrieved from a determined list of registers associated with various system components, such as a processing core, other elements outside the processing cores (also referred to as an uncore) which may encompass system agents, memory, graphics controller, display controller, memory controller, etc., and a controller hub which controls certain data paths and support functions used in conjunction with the CPU, as well as data from other types of registers. This crash data may be the lowest granularity of data to be collected when a crash is detected. This is typically in the form of a single register or a single trace message. The techniques of the disclosure may be implemented as processing logic in a crashlog unit (e.g., circuitry, dedicated logic, programmable logic, microcode, etc.) to provide the benefits described herein. The crashlog unit, in one embodiment, includes instructions to implement techniques for detecting various types of hangs and collect data from the determined list of registers associated with the core, uncore and controller hub components. In this way, there is a hang detector and a data collection flow for each component that may work independently, but also work in tandem with each other to form one integrated collection flow of crash data. This allows portions of the crash data collection to continue to work in case a hang occurs during any part of the collection flow.

Once the first hang detector logic detects a hang with a particular core, the crashlog unit is activated to produce a first log by reading contents of a pre-determined set of core registers. The crashlog unit exposes the contents of the log by saving the logs in a memory region outside of the core. The core then alerts a second hang detector logic associated with the uncore component (e.g., other processor elements outside the processing cores) that the core experienced a hang. This activates the crashlog unit to produce a second log based on contents of registers within the uncore component. For example, the contents of the uncore registers may be retrieved by using a state machine that saves the entire state of the system including, but not limited to, the state of the CPU registers, the power management status, the CPU cache, the system memory, the system cache, the video registers, the video memory, and the other device registers. Once the call is complete, the logs are then copied to a shared memory, such as static random access memory (SRAM) of a power management controller (PMC), associated with the controller hub. A hang detector associated with the controller hub is then alerted that the CPU experienced a hang. This activates the crashlog unit to produce a third log containing data from registers of the controller hub and store the third log in the shared SRAM.

The crash logs are stored together in the shared SRAM of the PMC associated with the controller hub to persist the data even in the case of a reset. For example, the crash logs may survive the reset because they are stored in controller hub, which has voltage rails that are kept powered in most reset situations. For example, the voltage rail coupled to the controller hub is the primary voltage rail on the platform, which is directly from the battery or power supply on the platform. In some embodiments, after a reset to recover from the hang, a basic input output system (BIOS) associated with the CPU may be configured to check for the existence of the crash logs. If the logs are present, the BIOS may copy the logs into a data structure that can later be stored onto a file in a hard drive. Hence, in the event of a hang, this additional persistence of the crash logs allows certain smart post-processing tools (e.g., Intel System Studio™) to analyze the content and provide further guidance as to the source of the hang, and how to proceed with debugging procedures including possible corrective measures. One advantage of the techniques disclosed herein is that they utilize existing in-band data paths to work in conjunction with the crashlog unit to reduce cost and increase the compatibility of the implementations with various system manufacture specifications.

Figure 1B:
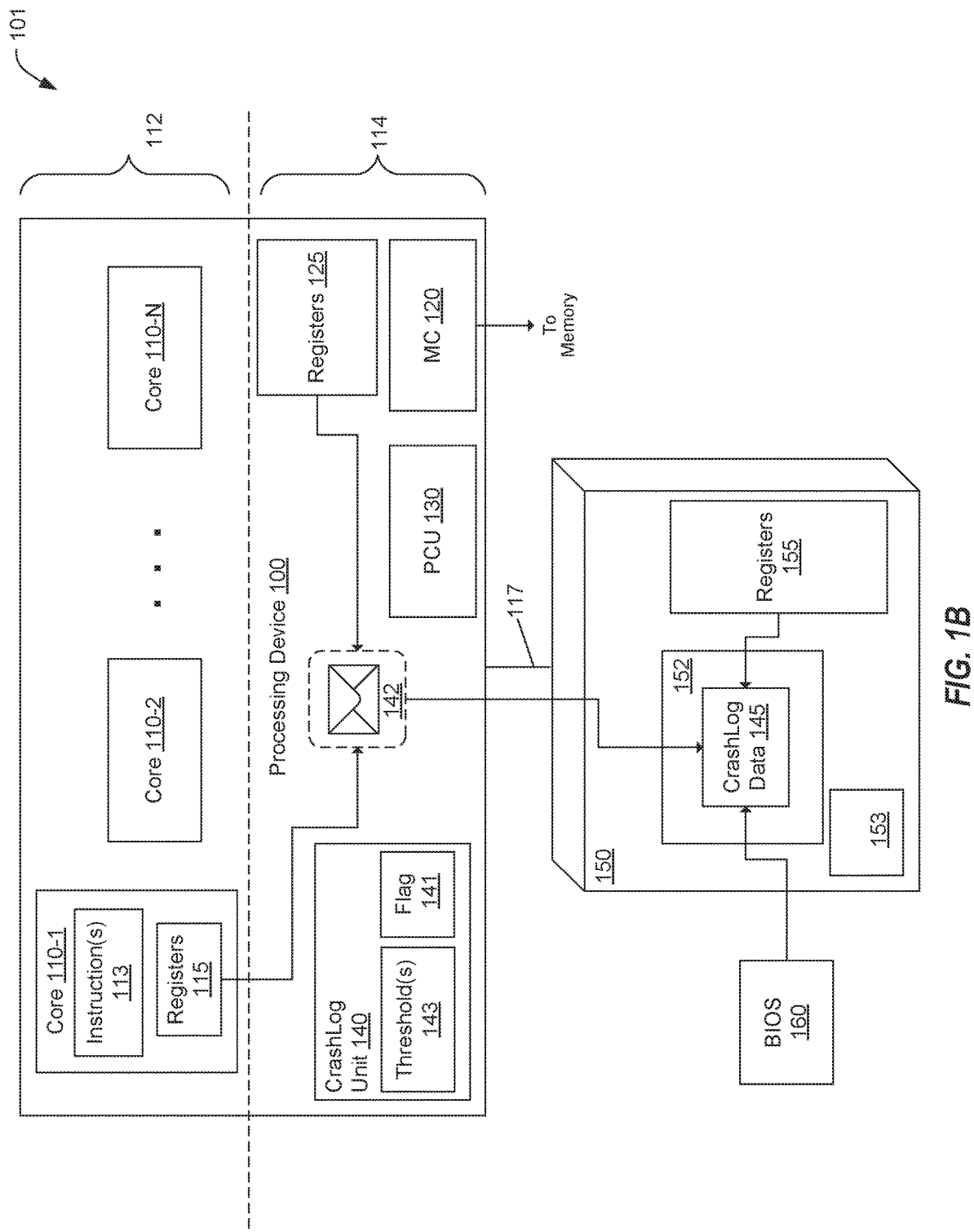
Figure 1C:
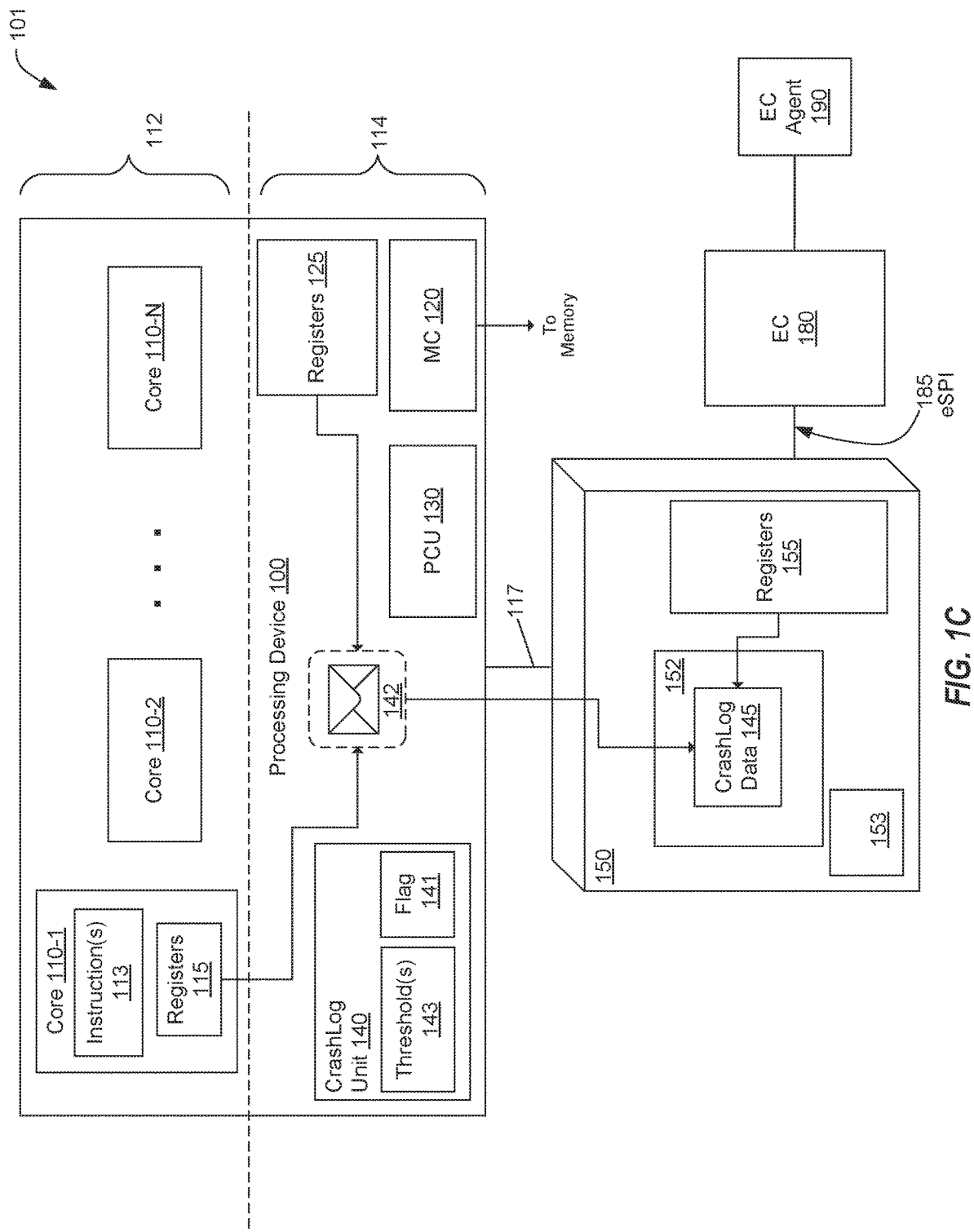

In alternative embodiments, the techniques of the disclosure can also implement support to trigger the production and extraction of the crash logs via an enhanced serial peripheral interface (eSPI) Out of Band (OOB) messaging. For example, an embedded controller (EC) agent may be connected to the controller hub via the eSPI. The EC may use this eSPI connection to detect a platform error and obtain crash records via the OOB path. For example, when a certain command is read from the eSPI message buffer, the PMC checks if a crash log has already been collected in the shared SRAM of the controller hub. If a crash log is not detected, the PMC triggers the crashlog unit to perform a crash log collection. Thereupon, the crashlog unit writes the contents of the crash log to the eSPI write data buffer for passage to EC agent, such as flash storage. An advantage of the capability using the EC is that it allows for the crash log information to be collected before the platform initiates a global reset or is shutdown as a result of a crash, which would normally result in loss of the crash log FIGS. 1A-1C illustrates a block diagram of a system 101 according to various embodiments. In one embodiment, the system 101 includes a processing device 100 and a memory (not shown). The memory for one such system is a dynamic random access memory (DRAM) memory. The DRAM memory can be located on the same chip as the processing device 100 and other system components. Additionally, other logic blocks such as a memory controller 120, graphics controller (not shown) or other types of controllers can also be located on the chip.

As shown in FIG. 1A, system 101 includes a processing device 100 to support hang detection and data recovery in microprocessor systems according to one embodiment. The processing device 100 may be generally referred to as "processor" or "CPU". "Processor" or "CPU" herein shall refer to a device that is capable of executing instructions 113 encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include multiple domains 112 and 114 which may include a core domain comprising one or more processors cores 110-1, 110-2, and an uncore domain 135 which may include other circuitry of the processing device 100 such as cache memories, a memory controller 120, other fixed function units, logic circuitry and so forth, coupled to each other as shown. The processing device 100 may also include a communication component (not shown), such as a bus, that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

In an illustrative example, processing core 110-1 may have a micro-architecture including processor logic and circuits. Processor cores with different micro-architectures may share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file). The processor core 110-1 may execute instructions 113 for the processing device 100. The instructions may include, but are not limited to, pre-fetch logic to fetch instructions, decode logic to decode the instructions, execution logic to execute instructions and the like.

Memory controller (MC) 120 may perform functions that enable the processing device 100 to access and communicate with memory (not shown) that includes a volatile memory and/or a non-volatile memory. In some embodiments, the memory controller 120 is located on a processor die associated with processing device 100, while the memory is located off the processor die. In some embodiments, processing device 100 includes a cache memory (not shown) to cache data from and to memory via memory controller 120. The cache includes, but is not limited to, a level one, level two, and a last level cache (LLC), or any other configuration of the cache memory within the processing device 100. In some embodiments, the L1 cache and L2 cache can transfer data to and from the LLC. In some embodiments, the cache memory can be integrated into the processing cores 110-1 through N. The cache memory may store data including instructions that are utilized by one or more components of the processing device 100.

System 101 further includes a power control unit (PCU) 130, which includes various circuitry, logic to perform power management operations for the processing device 100. In some embodiments, PCU 130 may be physically part of uncore domain 114. The uncore domain refers to other elements of the processing device 100 that are outside the processing cores. These other elements may include, but not limited to, system agents, memory, graphics controller, display controller, memory controller, etc.

The PCU 130 may receive power status information (which can be received in an encoded form) from controller hub 150 and based on this information may regulate power consumption by components of processing device 101. The processing device 100 may be coupled to the controller hub 150 via one or more communication bus(es) 117. The controller hub device 150 is configured to relieve the processing device 100 from performing certain functions of system 100, such as providing peripheral device support. In some embodiments, the controller hub may include interface and control circuitry to provide an interface between the processing device 100 and a variety of peripheral devices, such as input/output (TO) devices (not shown), e.g., user input devices (e.g., keyboard, touchpad, mouse or other pointing device, or so forth) and storage devices such as a mass storage, portable or other such storage, among many other peripheral devices.

The processing device 100 may be used with a computing system (e.g., system 101) on a single integrated circuit (IC) chip. The instructions 113 may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, a virtual machine monitor (VMM), a hypervisor, application programs, embedded software, and/or graphical user interfaces. Thus, embodiments of the disclosure are not limited to any specific combination of hardware circuitry and software.

System 101, in embodiments, may experience (in certain situations) various types of errors, including complete hangs due to the complexity of the hardware circuitry and software used therein. Embodiments of the disclosure providing techniques to detect certain condition in which the system hangs and gather crash logs based on these hangs. These crash logs can then be analyzed to provide further guidance as to the source of the hang, and how to proceed with debugging procedures including possible corrective measures. In some embodiments, system 101 includes processing logic in a crashlog unit 140 (e.g., circuitry, dedicated logic, programmable logic, microcode, etc.) to provide the benefits described herein. The crashlog unit 140, in one embodiment, includes instructions to implement techniques for detecting various types of hangs and collect data from registers 115, 125 and 155 that are respectively in the core region 112, uncore region 114 and controller hub 150 region. In this way, there is hang detection logic and a data collection flow for each region that may work independently of each other, but also together to form one integrated collection flow of crash data. This allows portions of the crash data collection to continue to work in case a hang occurs during any part of the collection flow.

In some embodiments, the processing device 100 may detect an error associated with the core region 112 of processing device 100 to initiate the collection of crash log data 145 in accordance with embodiments of the disclosure. The processing device 100 may implement a reporting architecture that uses hardware-level code (e.g., power control code (pCode) and microcode (uCode)) for certain macroinstructions. The crashlog unit 140 utilizes this reporting architecture to detect certain errors associated with at least one core of the core region 112 of the processing device 100. For example, if the amount of time to retire an operation of a pending instruction 113 executed by a particular core 110-1 exceeds a determined timeout threshold 143 (e.g., 2-6 seconds), this indicates that the core may be experiencing a hang.

When the core issues an error core due to the hang, the processing device 100 initiates a collection of crash log data 145. In some embodiments, the uCode of processing device 100 causes the crashlog unit 140 to collect and store the content of data registers 115 that are relevant for debugging. For example, the data registers 115 may include, but not limited to, registers of a machine check architecture (MCA) whose values provide detailed information about errors occurring in the system that may include core/thread identifiers, error codes, last branch record (LBR), last event record (LER), super queue state that contains the last attempted transaction, architecture state information as well as other type of relevant information.

Once the hang is detected, the uCode instructs the crashlog unit 140 to collect content of data registers 115. In some embodiments, a mailbox 142 (e.g., a dedicated region of shared memory) is used to transfer the collected data to a shared memory 152 (e.g., SRAM) of the controller hub 150. For example, each of the cores 110-1 through N may be associated with a mailbox 142, which is a dedicated region of shared memory, such as lower level cache (LLC) shared by the processor cores. The crashlog unit 140 inserts a header record into the mailbox 142 that includes a total number of bytes to be stored and format information of the crashlog data 145. The crashlog data 145 is written to the mailbox 142 in a certain quantity (64-bits) at a time.

A busy flag 141 is set to a value (e.g., 0 or 1) by the crashlog unit 140 to indicate that the crashlog data 145 is being written to the mailbox 142. For example, when the flag is set to 1, this is used to communicate from ucode to pcode that crashlog data 145 is ready for the pcode to consume. When the flag is set to 0, this is used to communicate from pcode to ucode that the crashlog data 145 has been consumed so that ucode can populate the next data in the mailbox 142 and set the flag again. Once the contents of the data registers 115 is completely written to mailbox 142, the crashlog unit 140 copies the data of the mailbox 142 to the shared memory 152 of the controller hub 150 and clears the busy flag.

When the hang occurs, the processing device 100 may transmit a signal, such as an internal error signal (IERR), which indicates an unrecoverable error. The core (e.g., core 110-1) that experienced the hang generates this IERR signal, which may also be propagated to other cores of the processing device 100. For example, the core generates an OOB signal that can still go through even if the primary or in band bus is hung. In some embodiments, the IERR signal is used to identify the core of interest to gather relevant crash log data. For example, upon detection of a hang, a broadcast message is sent to all of the cores 110-1, and the uCode in each thread of the cores through N simultaneously starts collecting crash log data. The crashlog unit 140, however, will access the mailbox 142 of the first core that signaled the IERR.

A collection flow for crash data of the uncore region 114 of processing device 100 may begin when a core signals an IERR. In some embodiments, the collection flow may also be independently initiated. For example, the collection flow can be manually trigger or a catastrophic error (CATERR) signal or other type of error codes generated by system 100. For example, the manual trigger is performed by writing a command to the BIOS pcode mailbox, which can be accessed via memory mapped I/O write or MSR write. When the collection flow is triggered, the contents of the uncore registers 125 may be retrieved by using a save/restore (S/R) state machine to save the entire state of the system including, but not limited to, the state of the CPU registers, the power management status, the CPU cache, the system memory, the system cache, the video registers, the video memory, and the other device registers. The S/R machines read the registers 125 in the uncore region 114 which are then stored in memory (e.g., SR SRAM) of the processing device 100. The crashlog unit 140 then flushes the SR SRAM entries containing contents of the registers 125 into shared SRAM 152 of the controller hub 150 via a connection bridge (e.g., an On-Chip System Fabric Side Band (IOSF-SB)).

A collection flow for crash data of the controller hub 150 starts after the uncore's flow is complete. In some embodiments, the collection flow may also be independently initiated. For example, a hang in the controller hub 150 can be detected independently based on the expiration of a timer, such as a connection timeout or internal timers, or based on a reset or shutdown cycle from the processing device 100. For example, the PMC 153 may trigger the crashlog unit 140, if it encounters an error or reset that is caused by a timeout of an internal timer or a shutdown special cycle from the CPU. In some embodiments, a power management controller (PMC) 153 of the controller hub 150 may detect the hang call the crashlog unit 140 to store the controller hub crashlog data 145 into a location inside the shared SRAM 152. The PMC 153, in embodiments, may implement firmware that includes programmable logic to call the crashlog unit 140. The controller hub crashlog data 145 will store in all controller hub data registers 155, including PMC, PCIE controllers, USB, OPI/DMI, and P2SB (Primary to Sideband Bridge) registers into the shared SRAM 153. Thereupon, a post-processing software tool (e.g. Intel® System Debugger) may be used to analyze the contents of the crashlog data 145 to guide the users in debug triage.

Turning to FIG. 1B, system 101 further includes a basic input output system (BIOS) 160 associated with the processing device 100. The BIOS 160 is used to perform hardware initialization to get system 101 started during a booting process. When system 101 is rebooted either through an automatic reset from the detected error (hang) or by manual reset, the BIOS 160 checks for the existence of the crashlog data 145. In one embodiment, before a shutdown of system 101 leading to a reset, the crashlog unit 140 may write the crash log data 145 for the core region 112, uncore region 114 and controller hub 150. The presence of the crashlog data 145 is an indication that a hang occurred prior to the reset. On the next BIOS boot after the hang, if the crashlog data 145 is present, the BIOS 160 copies the log into a data structure (e.g., advanced configuration power interface (ACPI) table) in the main memory. This data structure can later be stored onto a file in the hard drive or some non-volatile storage by, for example, a host application. Once the crash log data is on the hard drive or any non-volatile storage, it is safe and secured. Thereupon, post processing software (e.g., Intel® System Debugger) can be used to analyze the data and provide triage results.

With regards to FIG. 1C, system 101 further includes an embedded controller (EC) trigger the production and extraction of the crash logs data 145 in the event of a global reset by system 101. For example, the EC of some original equipment manufacturers (OEMs) can issue a global reset to system 101 after receiving a CATERR signal from processing device 100. The signal may be sent to the controller hub 150 a connection 185 to the EC 150. For example, the controller hub 150 of system 101 may be connected to the EC 180 via an enhanced serial peripheral interface (eSPI) connection. In some embodiments, PMC firmware can escalate to a global reset, even if the EC requests a warm reset that does not restart the whole system 101.

The EC 150 may use this eSPI connection 185 to detect when a platform error occurs and obtain the crash log data 145 stored in the shared SRAM 152. For example, the CATERR pin from the CPU that is signaled whenever there is a catastrophic error detected on the CPU. For example, when a certain command is read from the eSPI 185, the PMC 153 checks if a crash log has already been collected in the shared SRAM 152 of the controller hub 152. If a crash log data 145 is not detected, the PMC 153 triggers the crashlog unit 140 to perform a crash log collection for the crash log data 145 of the core region 112, uncore region 114 and the controller hub 150. Thereupon, the crashlog unit 140 writes the contents of the crash log data 145 to the eSPI 185 write data buffer for passage to EC agent 190, which may store the crash log data to flash storage connected to the EC. An advantage of the capability using the EC 180 is that it allows for the crash log information to be collected before the platform initiates a global reset or is shutdown as a result of a crash.

FIG. 2 is block diagram illustrating a request command data structure 200 according to various embodiments. The request command data structure 200 may be issued by an EC (e.g., EC 180) to trigger the production and extraction of the crash logs data 145. For example, the EC 180 may issue the request command data structure 200 in response to receiving a CATERR signal from processing device 100. The request command data structure 200 includes the following fields, which is a non-exhaustive list:

eSPI Cycle Type: the ESPI channel (Virtual Wire, Peripheral, Flash, OOB)
Tag: Unique identifier of the transaction
Length: Length of the entire transaction in bytes
Dest Slave Address: Address of the eSPI slave to which the transaction is being sent
Command Code: The opcode of the transaction
Byte Count: Number of bytes of the payload of the transaction
Source Slave Address: Address of the eSPI slave from which the transaction was generated FIG. 3 is block diagram illustrating a response command data structure 300 according to various embodiments. In response to the request from the EC 180, the response command data structure 300 comprising crash log data is written to the eSPI 185 write data buffer for passage to EC agent 190. The response command data structure 300 includes the following fields, which is a non-exhaustive list:
eSPI Cycle Type: the ESPI channel (Virtual Wire, Peripheral, Flash, OOB)
Tag: Unique identifier of the transaction
Length: Length of the entire transaction in bytes
Dest Slave Address: Address of the eSPI slave to which the transaction is being sent
Command Code: The opcode of the transaction
Byte Count: Number of bytes of the payload of the transaction
Crash Data Record: Aggregate Crash Data from a Crash Node.

Figure 4:
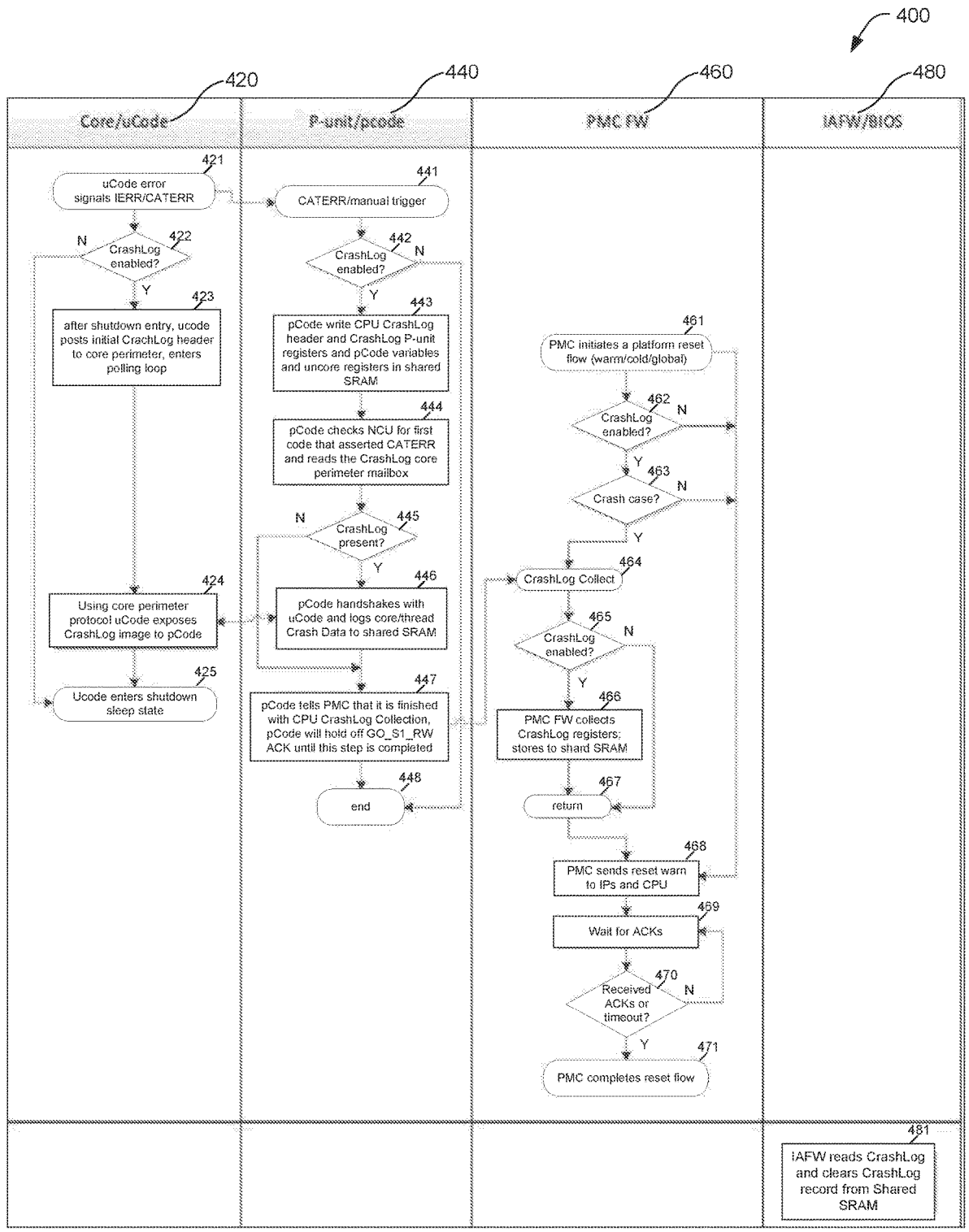
FIG. 4 illustrates a flow diagram for initiating data flow collections according to various embodiments.

FIG. 4 illustrates a flow diagram 400 for initiating data flow collections 420, 440, 460 and 480 according to various embodiments. In some embodiments, each data flow collection is associated with collect crash log data. The crash log data is the lowest granularity of data to be collected when a crash is detected. This is typically in the form of a single register or a single trace message. For example, the crash log data may be collected from certain registers relevant to a particular event. In some embodiments, a crash data requestor is responsible for generating crash data requests and either stores or forwards the data to crash data storage (e.g., shared SRAM 152 of the controller hub 150). The crash data requestor is typically the P-unit, PMC, CSME, external baseboard controller (e.g., BMC). When a crash detector identifies a subsystem that has failed, the crash data requestor may execute a crash data collector (e.g., crashlog unit 140) to implement the data flow collections 420, 440, 460 and 480. For example, data flow collection 420 collects data from registers of the core region 112 of a processing device 100, data flow collection 440 collects data from registers of the uncore region 114, data flow collection 460 collects data from registers of the core region 112, data flow collection 460 collects the crashlog data based on a global reset event. In some embodiment, the data flow collections 420, 440, 460 and 480 may be triggered and work independently, but also work in tandem to form one integrated collection flow of crash data. The crash data collector then makes the data in the crash data storage (e.g., shared SRAM 152 of the controller hub 150) available to software (e.g., system firmware) after a platform reset. In some embodiments, a crash data extractor (e.g., system agent) gathers the crash log data 145 and publishes this data for a consumer, such as operating system or management server.

Data flow collection 420 for the core region 112, begins in block 421 where an error signal (e.g., IERR/CATERR) is detected. In block 422, it is determined whether the crashlog unit 140 is enabled. If not, the system 101 enters a shutdown sleep state in block 425. Otherwise, crashlog unit 140 collects crashlog data 145 for the core region 112 in a mailbox 142 in block 423. In block 424, the crashlog unit 140 exposes the crashlog data so that it can be copied to the shared memory 152 of the controller hub 150.

In some embodiments, the data flow collection 440 for the uncore region 140, begins with a hand off the crashlog data collection in block 446. In other embodiments, the data flow collection 440 for the uncore region 140 can be trigger manual or by detecting a CATERR in block 441. In block 442, it is determined whether the crashlog unit 140 is enabled. If not, the data flow collection 440 ends. Otherwise, crashlog unit 140 writes data associated with the uncore registers 125 to the shared SRAM 152 of the controller hub 150 in block 443. In block 444, the crashlog unit 140 then reads the crashlog data for the mailbox 142 of the core that signaled the error. In block 445, it is determined whether the crashlog data is present. If not, the PMC 153 is instructed to hold off on the reset until receiving an acknowledgement signal that the data collection is complete.

In some embodiments, the data flow collection 460 for the controller hub 150, begins with a hand off the crashlog data collection in block 464. In other embodiments, the data flow collection 460 for the controller hub 150 is initiated in block 461 when the PMC 153 receives a reset signal. In block 462, it is determined whether the crashlog unit 140 is enabled. If it is, then in block 463 it is determined what type of crash has occurred. In block 464, the crashlogs for the core and uncore are collected. In block 465, it is determined whether the crashlogs are present. In block 466, data from registers in the controller hub 150 are collected and stored in the shared SRAM 152. In block 468, the PMC sends the reset signal to the controller hub 150. In block 469, the PMC waits for an acknowledgment from the platform. In block 470, it is determined whether the acknowledgment is received or a timeout is triggered. In block 471, the PMC 153 completes the reset.

Data flow collection 480, begins in block 481 where it is determined whether the crashlog data 145 is present in the shared SRAM. If so, the BIOS 160 reads the log into a data structure (e.g., advanced configuration power interface (ACPI) table) in main memory. This data structure can later be stored onto a file in the hard drive or some non-volatile storage by, for example, a host application.

Figure 5:
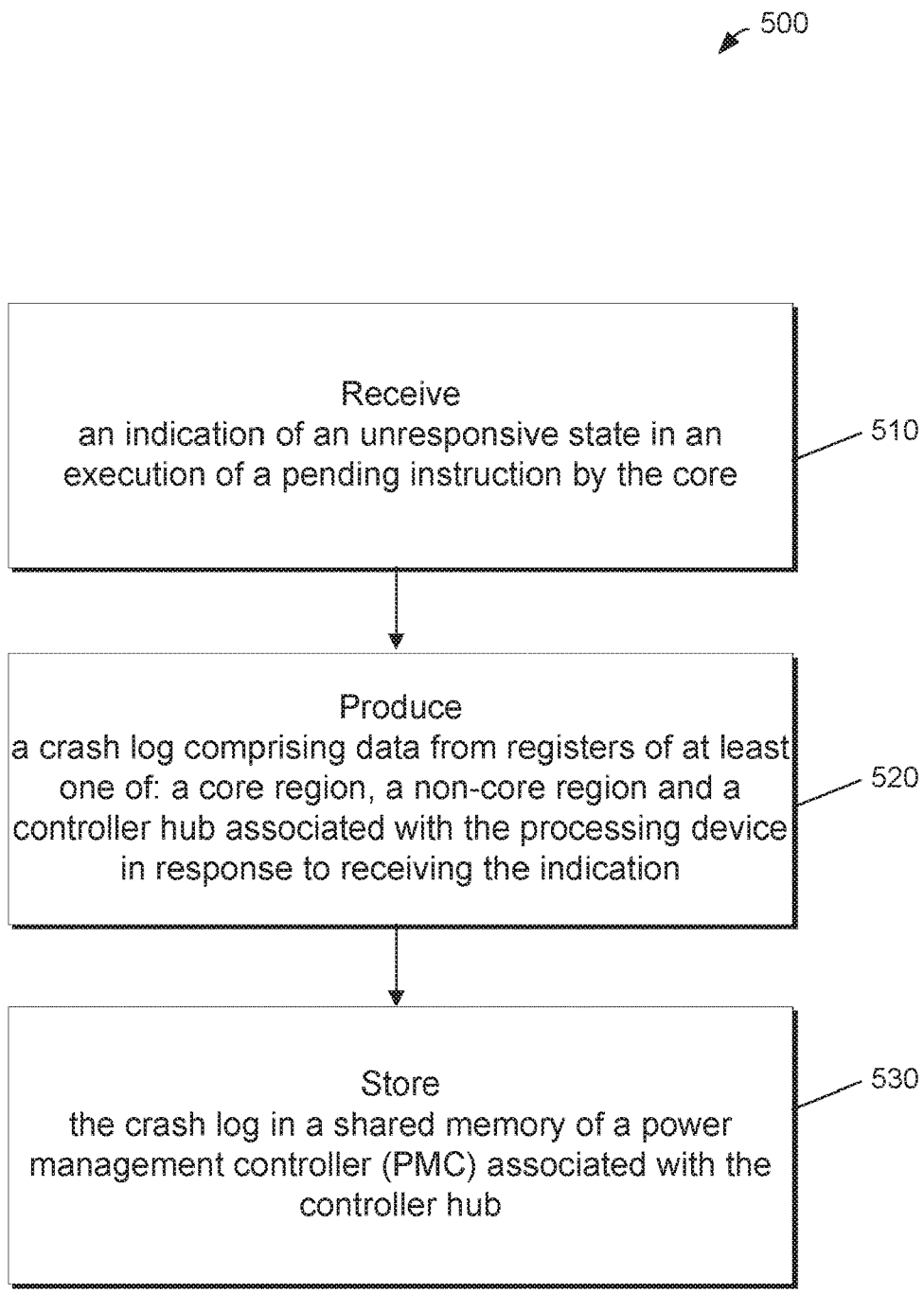
FIG. 5 illustrates a flow diagram of a method for supporting hang detection and data recovery in microprocessor systems according to one embodiment.

FIG. 5 illustrates a flow diagram of a method 500 for supporting hang detection and data recovery in microprocessor systems according to one embodiment. Method 500 may be performed by processing logic that may comprise hardware (e.g., circuitry, dedicated logic, programmable logic, microcode, etc.), software (such as instructions run on a processing device), firmware, or a combination thereof. In one embodiment, the crashlog unit 140 of processing device 100 in FIG. 1 may perform method 500. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 500 begins, at block 510, where an indication 221, 241, 261 of an unresponsive state in an execution of a pending instruction 113 by a core 110-1 is received. In block 520, a crash log 145 is produced in response to receiving the indication 221, 241, 261. The crash log 224, 246 and 266 comprises data from registers 115, 125, 155 of at least one of: a core region 112, a non-core region 114 and a controller hub 150 associated with a processing device 101. In block 530, the crash log 145 is stored in shared memory 152 of a power management controller (PMC) 153 associated with the controller hub 150.

FIG. 6A is a block diagram illustrating a micro-architecture for a processor 600 that implements techniques for supporting hang detection and data recovery in microprocessor systems in accordance with one embodiment of the disclosure. Specifically, processor 600 depicts an in-order architecture core and a register renaming logic, out-of-order issue/execution logic to be included in a processor according to at least one embodiment of the disclosure. In one implementation, processor 600 is the same as processor 100 to perform hang detection and data recovery described with respect to FIG. 1.

Processor 600 includes a front-end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware embodiments, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one embodiment, processor 600 may be the same as processing device 100 described with respect to FIG. 1 supporting hang detection and data recovery in microprocessor systems as described with respect to embodiments of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming is used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
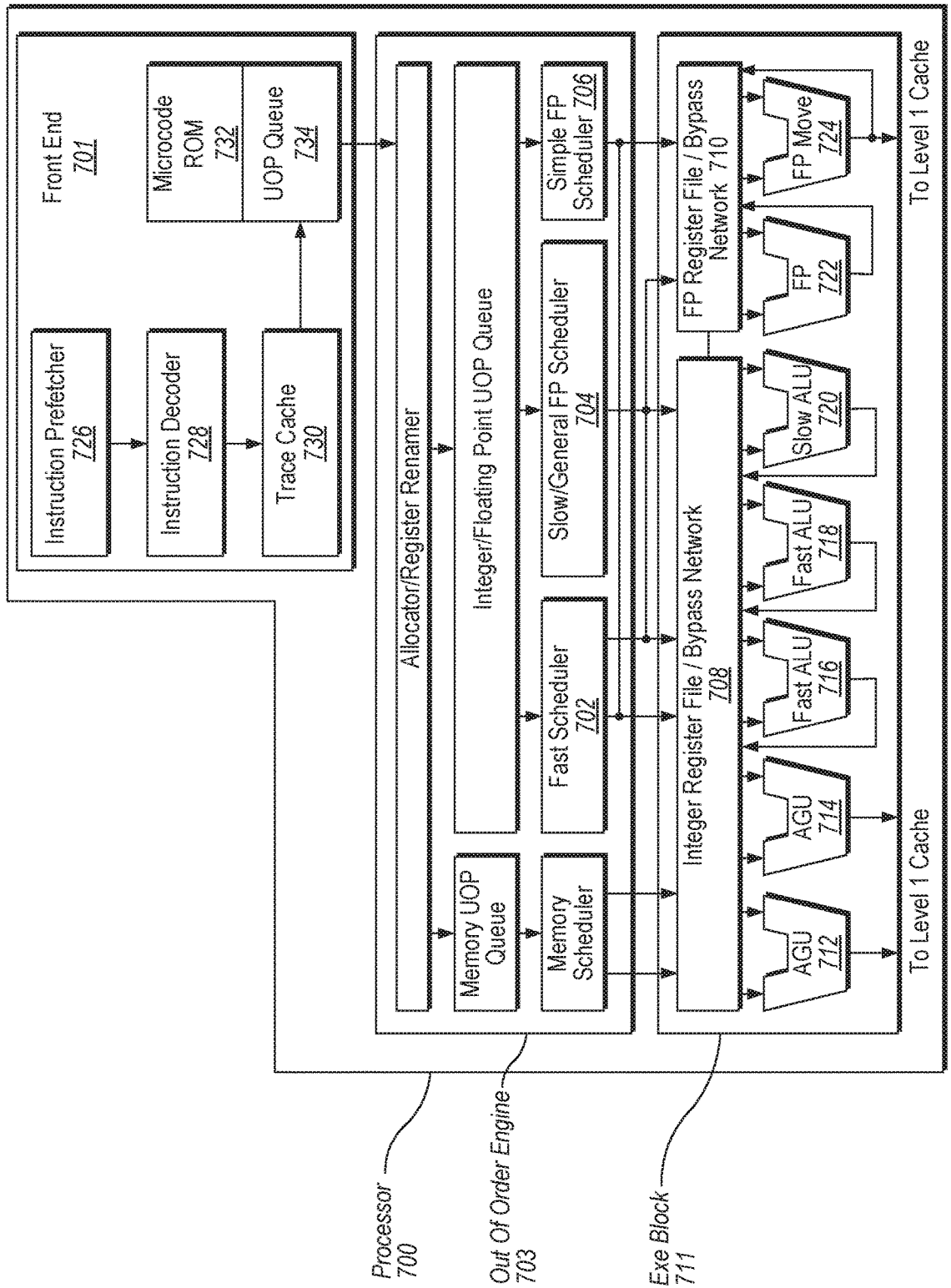
FIG. 7 is a block diagram illustrating a micro-architecture for a processor in accordance with one embodiment of the disclosure.

FIG. 7 illustrates a block diagram of the micro-architecture for a processor 700 that includes logic circuits to implement techniques for supporting hang detection and data recovery in microprocessor systems in accordance with one embodiment of the disclosure. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct microinstruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710, for integer and floating-point operations, respectively. Each register file 708, 710, of one embodiment also includes a bypass network that can bypass or forward just completed results that have not yet been written into the register file to new dependent uops. The integer register file 708 and the floating-point register file 710 are also capable of communicating data with the other. For one embodiment, the integer register file 708 is split into two separate register files, one register file for the low order 32 bits of data and a second register file for the high order 32 bits of data. The floating-point register file 710 of one embodiment has 128 bit wide entries because floating-point instructions typically have operands from 64 to 128 bits in width.

The execution block 711 contains the execution units 712, 714, 716, 718, 720, 722, 724, where the instructions are actually executed. This section includes the register files 708, 710 that store the integer and floating point data operand values that the microinstructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating-point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. The AGUs 712, 714 may execute memory load/store operations. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating-point units 722, 724, can be implemented to support a range of operands having bits of various widths. For one embodiment, the floating-point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic according to embodiments of the disclosure. In one embodiment, the execution block 711 of processor 700 may include a crashlog unit 140 for implementing techniques for supporting hang detection and data recovery in microprocessor systems in accordance with one embodiment of the disclosure. In some embodiments, processor 700 may be the processing device 100 of FIG. 1.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. In one embodiment, a register file also includes eight (8) multimedia SIMD register(s) for the packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
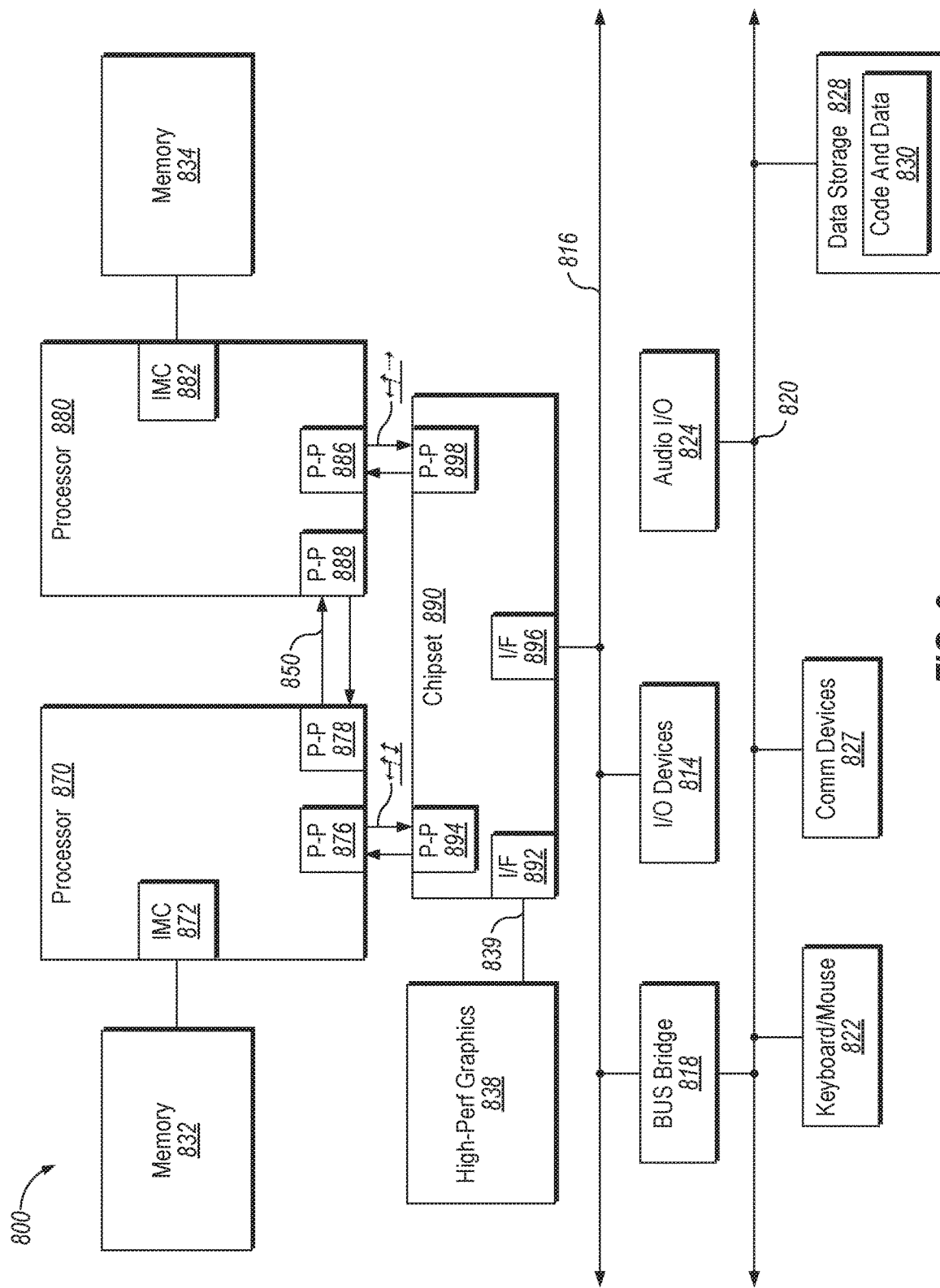
FIG. 8 is a block diagram illustrating a system in which an embodiment of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement techniques for supporting hang detection and data recovery in microprocessor systems as described herein. In some embodiments, the two processors 870, 880 are the processing device 100 of FIG. 1.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point-to-point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
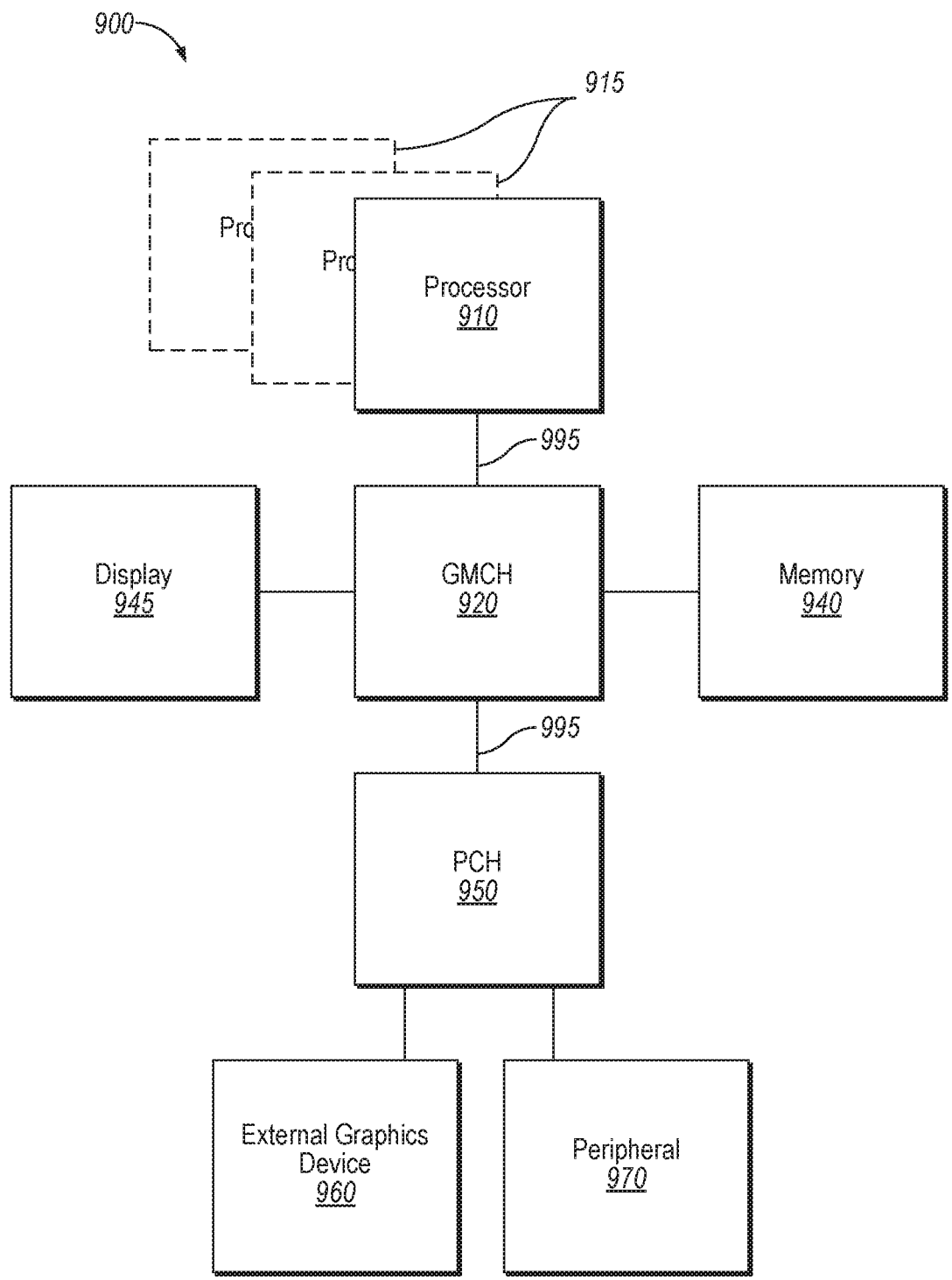
FIG. 9 is a block diagram illustrating a system in which an embodiment of the disclosure may operate.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 provide for supporting hang detection and data recovery in microprocessor systems according to embodiments of the disclosure. In some embodiments, the processors 910, 915 are the processing device 100 of FIG. 1.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a front side bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) power controller hub (controller hub) 950, which may be used to couple various peripheral devices to system 900. Shown for example in the embodiment of FIG. 9 is an external graphics device 960, which may be a discrete graphics device, coupled to controller hub 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
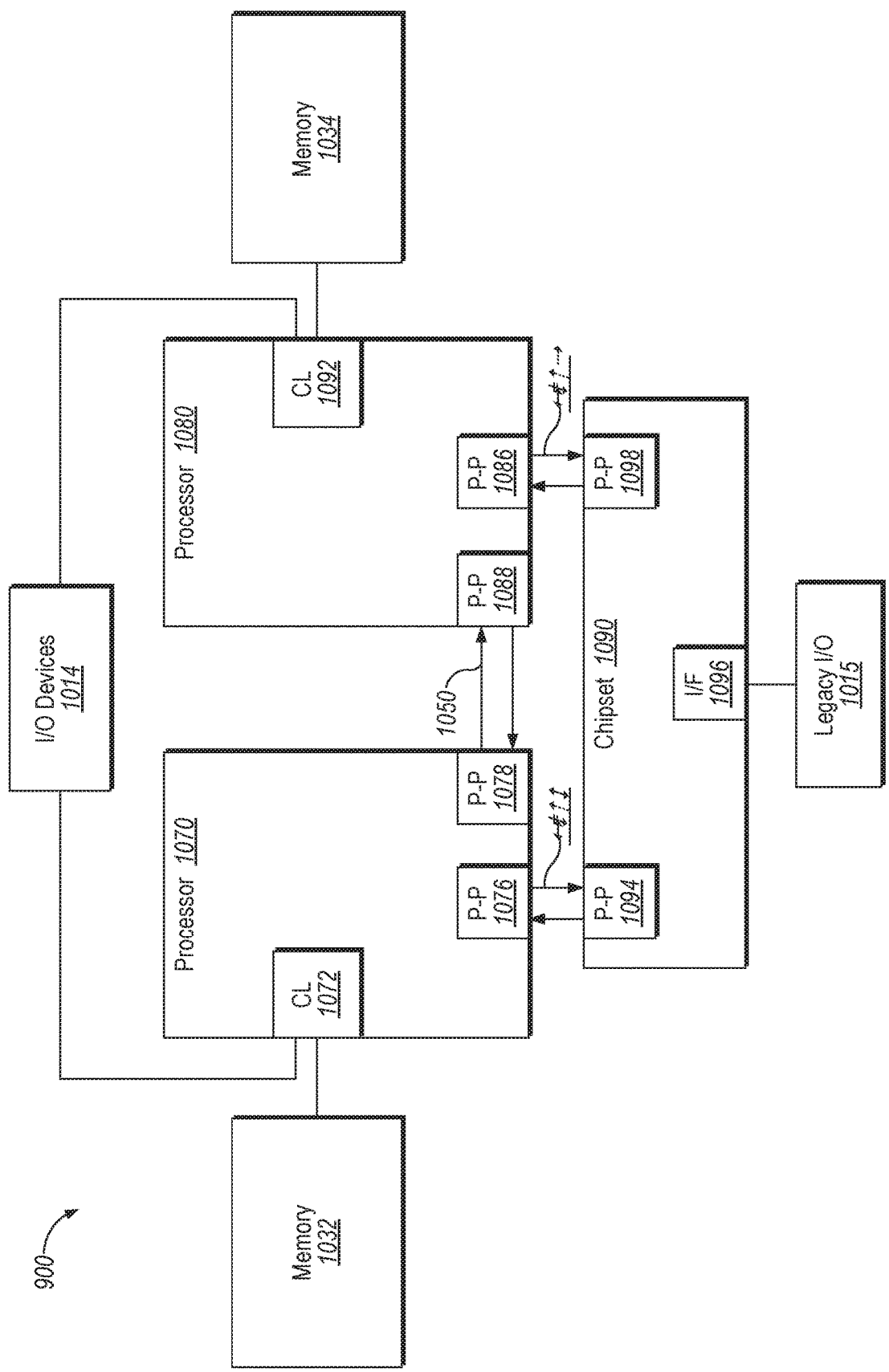
FIG. 10 is a block diagram illustrating a system in which an embodiment of the disclosure may operate.

Referring now to FIG. 10, shown is a block diagram of a system 1000 in which an embodiment of the disclosure may operate. FIG. 10 illustrates processors 1070, 1080. In one embodiment, processors 1070, 1080 may provide for supporting hang detection and data recovery in microprocessor systems as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096. The embodiments of the processing device 100 of FIG. 1 may be implemented in processor 1070, processor 1080, or both.

Figure 11:
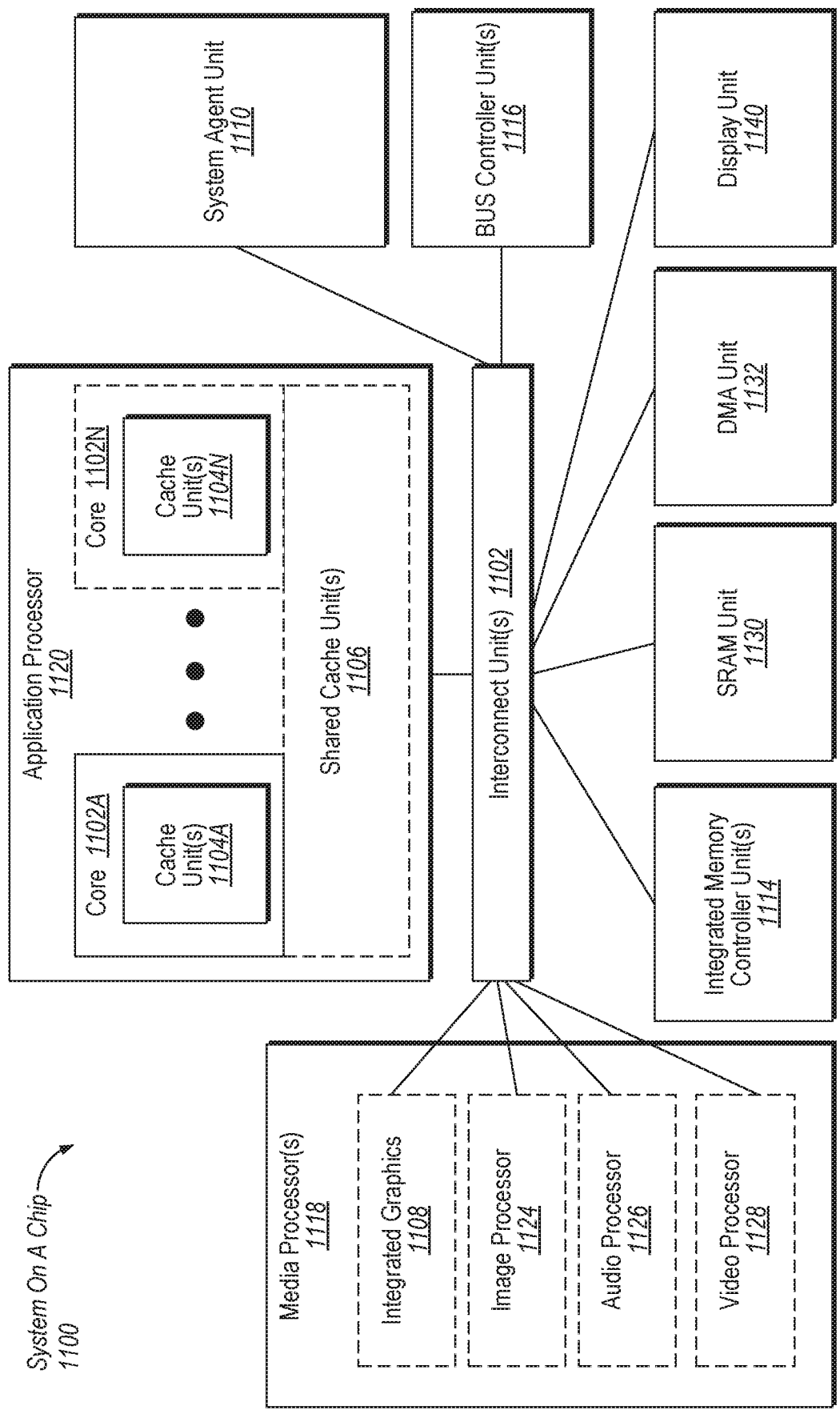
FIG. 11 is a block diagram illustrating a System-on-a-Chip (SoC) according to an embodiment of the disclosure.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set of one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The SoC 1100 also includes logic to implement crashlog unit 140 according to embodiments of the disclosure. In one embodiment, the execution block 711 of SoC 1100 may include the crashlog unto 140 for implementing techniques for supporting hang detection and data recovery in microprocessor systems in accordance with one embodiment of the disclosure. In some embodiments, SoC 1100 may be the processing device 100 of FIG. 1.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
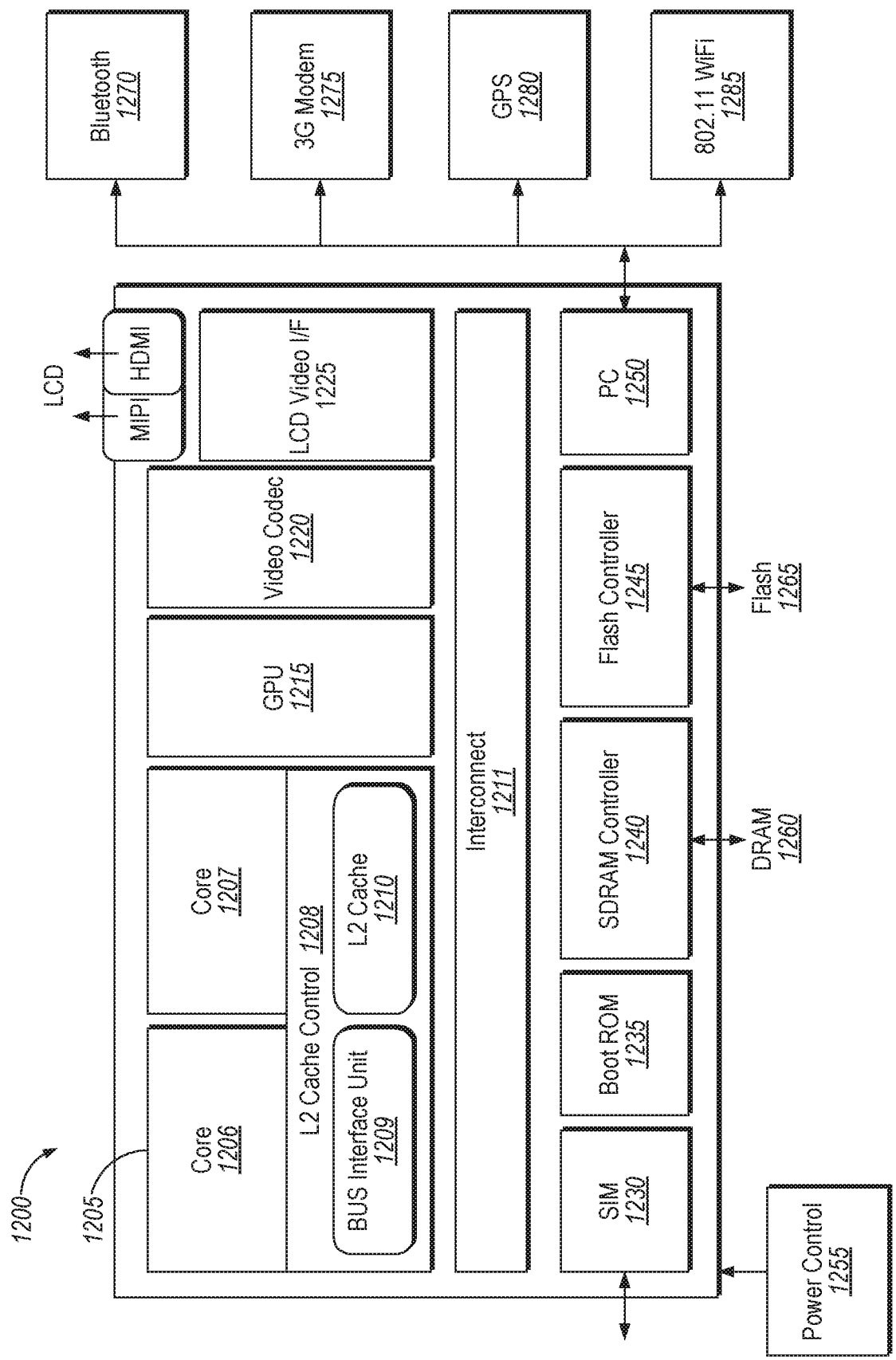
FIG. 12 is a block diagram illustrating a SoC design according to an embodiment of the disclosure.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may provide for supporting hang detection and data recovery in microprocessor systems as described in embodiments herein. In some embodiments, the cores 1206, 1207 are the processing cores 110 of FIG. 1.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1247 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
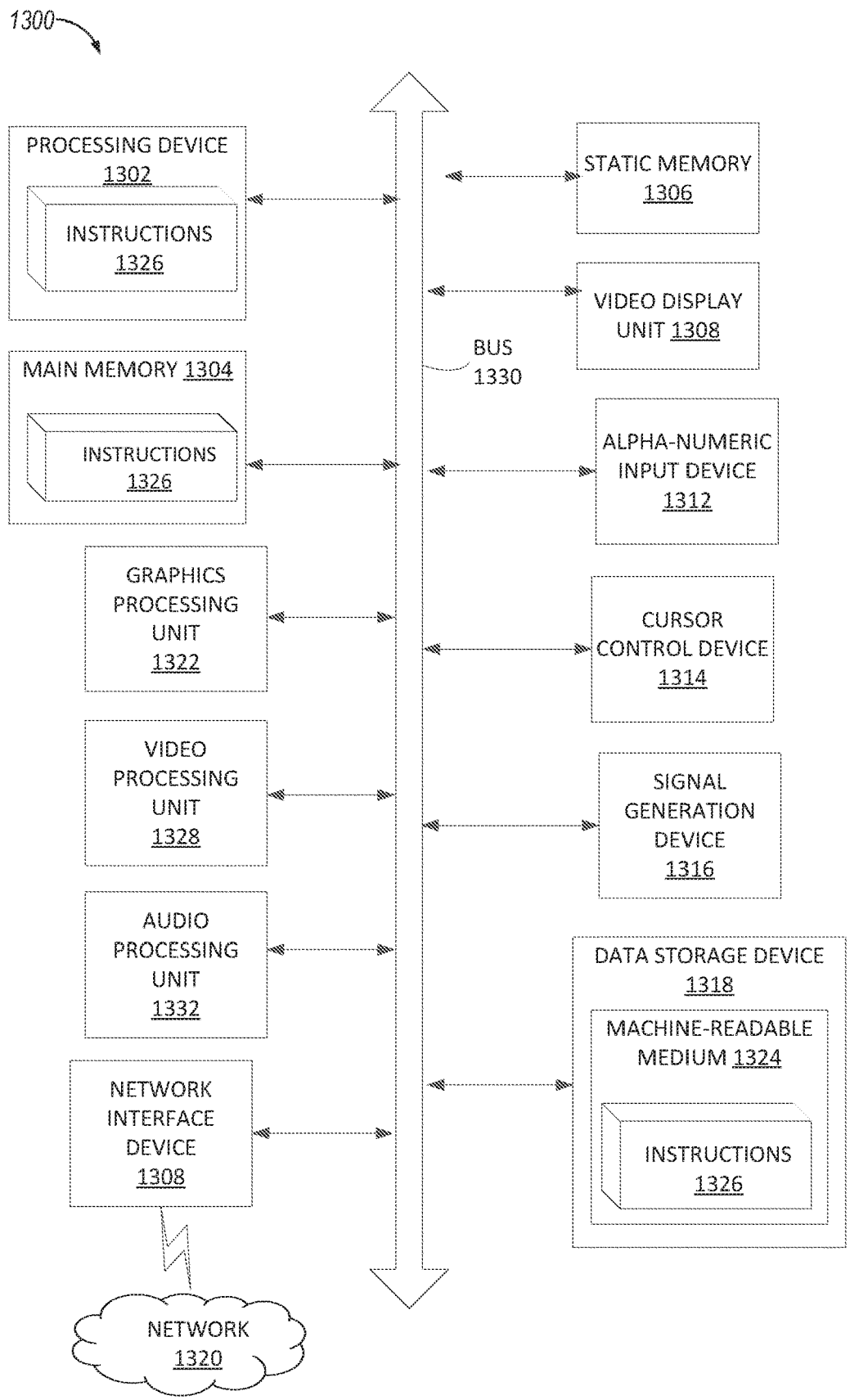
FIG. 13 illustrates a block diagram illustrating a computer system according to an embodiment of the disclosure.

FIG. 13 illustrates a diagrammatic representation of a machine in the example form of a computer system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or more processing cores. The processing device 1302 is configured to execute the processing logic 1326 for performing the operations and steps discussed herein. In one embodiment, processing device 1302 is the same as processing device 100 described with respect to FIG. 1 that implement techniques for supporting hang detection and data recovery in microprocessor systems as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics-processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing crashlog unit 140 in processing device 100 for FIG. 1, as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media. In some embodiments, data storage device 1318 may include a non-transitory computer-readable storage medium, such as computer-readable storage medium 1324, on which may store instructions 1326 encoding any one or more of the methods or functions described herein, including instructions encoding the techniques including the crashlog unit 140 of FIG. 1.

The machine-readable storage medium 1324 may also be used to store instructions 1326 implementing crashlog unit 140 instructions on threads in a processing device such as described with respect to processing device 100 in FIG. 1, and/or a software library containing methods that call the above applications. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 Example 1 includes a processing device comprising: a processing core; and a crashlog unit, operatively coupled to the core, to receive an indication of an unresponsive state in an execution of a pending instruction by the core; responsive to receiving the indication, produce a crash log comprising data from registers of at least one of: a core region, a non-core region and a controller hub associated with the processing device; and store the crash log in a shared memory of a power management controller (PMC) associated with the controller hub.

Example 2 includes the processing device of example 1, wherein the crashlog unit is further to: responsive to detecting a system reset, determine, using a basic input output system (BIOS), that the crash logs are stored in the shared memory of the PMC; and copy, using the BIOS, the crash logs to advanced configuration power interface (ACPI) data structure.

Example 3 includes the processing device of example 1, wherein the crashlog unit is further to: responsive to detecting that a time to retire an operation of the pending instruction exceeds a timeout threshold, retrieve the crash log comprising the data from registers of the core region.

Example 4 includes the processing device of example 1, wherein the crashlog unit is further to, responsive to detecting that a hardware error code associated with the core, retrieve the crash log comprising the data from registers of the uncore region.

Example 5 includes the processing device of example 1, wherein the crashlog unit is further to, responsive to detecting a reset event associated with the controller hub, retrieve the crash log comprising the data from registers of the controller hub region.

Example 6 includes the processing device of example 1, wherein the crashlog unit is further to write the crash log associated with the core region to a communication channel outside of the core that is in the unresponsive state.

Example 7 includes the processing device of example 1, wherein the crashlog unit is further to: receive a command via an enhanced serial peripheral interface (eSPI); determine whether the crash logs are stored in the shared memory of the PMC; and retrieve the data associated with the crash logs to transmit, via the eSPI, to an embedded controller (EC).

Example 8 includes a method comprising: receiving, by a processing device, an indication of an unresponsive state in an execution of a pending instruction by the core; responsive to receiving the indication, producing, by the processing device, a crash log comprising data from registers of at least one of: a core region, a non-core region and a controller hub associated with the processing device; and storing, by the processing device, the crash log in a shared memory of a power management controller (PMC) associated with the controller hub.

Example 9 includes the method of example 8, further comprising: responsive to detecting a system reset, determining, using a basic input output system (BIOS), that the crash logs are stored in the shared memory of the PMC; and copying, using the BIOS, the crash logs to advanced configuration power interface (ACPI) data structure.

Example 10 includes the method of example 8, further comprising: responsive to detecting that a time to retire an operation of the pending instruction exceeds a timeout threshold, retrieving the crash log comprising the data from registers of the core region.

Example 11 includes the method of example 8, further comprising: responsive to detecting that a hardware error code associated with the core, retrieving the crash log comprising the data from registers of the uncore region.

Example 12 includes the method of example 8, further comprising: responsive to detecting a reset event associated with the controller hub, retrieving the crash log comprising the data from registers of the controller hub region.

Example 13 includes the method of example 8, further comprising: writing the crash log associated with the core region to a communication channel outside of the core that is in the unresponsive state.

Example 14 includes the processing device of example 1, further comprising: receiving a command via an enhanced serial peripheral interface (eSPI); determining whether the crash logs are stored in the shared memory of the PMC; and retrieving the data associated with the crash logs to transmit, via the eSPI, to an embedded controller (EC).

Example 15 includes a system comprising: a controller hub; and a crashlog unit, operatively coupled to the controller hub, to receive an indication of an unresponsive state in an execution of a pending instruction by the core; responsive to receiving the indication, produce a crash log comprising data from registers of at least one of: a core region, a non-core region and the controller hub; and store the crash log in a shared memory of a power management controller (PMC) associated with the controller hub.

Example 16 includes the system of example 15, wherein the crashlog unit is further to: responsive to detecting a system reset, determine, using a basic input output system (BIOS), that the crash logs are stored in the shared memory of the PMC; and copy, using the BIOS, the crash logs to advanced configuration power interface (ACPI) data structure.

Example 17 includes the system of example 15, wherein the crashlog unit is further to: responsive to detecting that a time to retire an operation of the pending instruction exceeds a timeout threshold, retrieve the crash log comprising the data from registers of the core region.

Example 18 includes the system of example 15, wherein the crashlog unit is further to, responsive to detecting that a hardware error code associated with the core, retrieve the crash log comprising the data from registers of the uncore region.

Example 19 includes the system of example 15, wherein the crashlog unit is further to, responsive to detecting a reset event associated with the controller hub, retrieve the crash log comprising the data from registers of the controller hub region.

Example 20 includes the system of example 15, wherein the crashlog unit is further to write the crash log associated with the core region to a communication channel outside of the core that is in the unresponsive state.

While the disclosure has been described respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering or re-transmission of the electrical signal is performed, and a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code, which is executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and/or 'operable to,' in one embodiment, refers to some apparatus, logic, hardware, and/or element designed in such a way to enable use of the apparatus, logic, hardware, and/or element in a specified manner. Note as above that use of, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
   a processing core; and
   a crashlog unit, operatively coupled to the processing core, to
   receive an indication of an unresponsive state in an execution of a pending instruction by the processing core;
   responsive to receiving the indication, produce a crash log comprising data from registers of at least one of a core region or a non-core region;
   store the crash log in a first memory, wherein the first memory is shared between the processing core and at least one other processing core; and
   transfer the crash log from the first memory to a second memory, wherein the second memory is static random access memory (SRAM) associated with a controller hub.

2. The processing device of claim 1, wherein the crashlog unit is further to:
   responsive to detecting a system reset, determine, using a basic input output system (BIOS), that the crash log is stored in the second memory; and
   copy, using the BIOS, the crash log to advanced configuration power interface (ACPI) data structure.

3. The processing device of claim 1, wherein the crashlog unit is further to:
   responsive to detecting that a time to retire an operation of the pending instruction exceeds a timeout threshold, retrieve the crash log comprising the data from registers of the core region.

4. The processing device of claim 1, wherein the crashlog unit is further to, responsive to detecting that a hardware error code associated with the processing core, retrieve the crash log comprising the data from registers of the non-core region.

5. The processing device of claim 1, wherein the crashlog unit is further to, responsive to detecting a reset event associated with the controller hub, retrieve the crash log further comprising data from registers of the controller hub.

6. The processing device of claim 1, wherein the crashlog unit is further to write the crash log comprising the data from registers of the core region to a communication channel outside of the processing core that is in the unresponsive state.

7. The processing device of claim 1, wherein the crashlog unit is further to:
   receive a command via an enhanced serial peripheral interface (eSPI);
   determine whether the crash log is stored in the second memory; and
   retrieve data associated with the crash log to transmit, via the eSPI, to an embedded controller.

8. The processing device of claim 1, further comprising:
   receiving a command via an enhanced serial peripheral interface (eSPI);
   determining whether the crash log is stored in the second memory; and
   retrieving the data associated with the crash log to transmit, via the eSPI, to an embedded controller.

9. A method comprising:
   receiving, by a processing device, an indication of an unresponsive state in an execution of a pending instruction by a processing core;
   responsive to receiving the indication, producing, by the processing device, a crash log comprising data from registers of at least one of a core region or a non-core region;
   storing the crash log in a first memory, wherein the first memory is shared between the processing core and at least one other processing core; and transferring, by the processing device, the crash log from the first memory to a second memory, wherein the second memory is static random access memory (SRAM) associated with a controller hub.

10. The method of claim 9, further comprising:
responsive to detecting a system reset, determining, using a basic input output system (BIOS), that the crash log is stored in the second memory; and
copying, using the BIOS, the crash log to advanced configuration power interface (ACPI) data structure.

11. The method of claim 9, further comprising:
responsive to detecting that a time to retire an operation of the pending instruction exceeds a timeout threshold, retrieving the crash log comprising the data from registers of the core region.

12. The method of claim 9, further comprising:
responsive to detecting that a hardware error code associated with the processing core, retrieving the crash log comprising the data from registers of the non-core region.

13. The method of claim 9, further comprising:
responsive to detecting a reset event associated with the controller hub, retrieving the crash log further comprising data from registers of the controller hub.

14. The method of claim 9, further comprising:
writing the crash log comprising the data from registers of the core region to a communication channel outside of the processing core that is in the unresponsive state.

15. A system comprising:
a controller hub; and
a crashlog unit, operatively coupled to the controller hub, to
receive an indication of an unresponsive state in an execution of a pending instruction by a processing core;
responsive to receiving the indication, produce a crash log comprising data from registers of at least one of a core region or a non-core region;
store the crash log in a first memory, wherein the first memory is shared between the processing core and at least one other processing core; and
transfer the crash log from the first memory to a second memory, wherein the second memory is static random access memory (SRAM) associated with the controller hub.

16. The system of claim 15, wherein the crashlog unit is further to:
responsive to detecting a system reset, determine, using a basic input output system (BIOS), that the crash log is stored in the second memory; and
copy, using the BIOS, the crash log to advanced configuration power interface (ACPI) data structure.

17. The system of claim 15, wherein the crashlog unit is further to:
responsive to detecting that a time to retire an operation of the pending instruction exceeds a timeout threshold, retrieve the crash log comprising the data from registers of the core region.

18. The system of claim 15, wherein the crashlog unit is further to, responsive to detecting that a hardware error code associated with the processing core, retrieve the crash log comprising the data from registers of the non-core region.

19. The system of claim 15, wherein the crashlog unit is further to, responsive to detecting a reset event associated with the controller hub, retrieve the crash log further comprising data from registers of the controller hub.

20. The system of claim 15, wherein the crashlog unit is further to write the crash log comprising the data from registers of the core region to a communication channel outside of the processing core that is in the unresponsive state.

* * * * *